UNITED STATES PATENT OFFICE.

ADOLPH SCHMIDT, OF DRESDEN, GERMANY, ASSIGNOR TO CHEMISCHE FABRIK HELFENBERG, A. G., FORMERLY EUGEN DIETERICH, A CORPORATION OF GERMANY.

AGAR-AGAR-CASCARA PRODUCT.

943,163.  Specification of Letters Patent.  Patented Dec. 14, 1909.

No Drawing.  Application filed October 10, 1906.  Serial No. 338,271.

*To all whom it may concern:*

Be it known that I, ADOLPH SCHMIDT, a subject of the Emperor of Germany, and a resident of the city of Dresden, Germany, have invented a certain new and useful Agar-Agar-Cascara Product, of which the following is a specification.

The utility of the product of my present invention is its use as a remedy or medicine for constipation.

The product comprises a mixture of two substances, agar-agar and cascara preferably.

The agar-agar of the product is in dry or ungelatinized form. It is highly preferable that the cascara should be in solid, rather than in liquid form, since otherwise the tendency will be to cause premature gelatinization of the agar-agar, that is to say, gelatinization before the material is taken into the alimentary tract. Such premature gelatinization is disadvantageous for the same reason that agar-agar in the form of a jelly, decoction or soup is ineffective to produce the results of the product herein even though same were to be mixed with cascara. The reason for this is that agar-agar jelly and agar-agar decoctions are absorbed in the alimentary tract and accordingly have been eaten as a food from time immemorial. Whereas, dry ungelatinized agar-agar is not absorbed in the digestive tract and accordingly arrives in the large intestine in a still solid condition, although somewhat gelatinized. Here the gelatinization is completed, but still without loss of the solid nature of the mass. The agar-agar particles or granules become wet, slippery, soft, swollen masses which mixing with the feces increase their bulk and lubricate both the feces and the walls of the bowel. The effect of said admixture is to bring the contents of the bowel to the moist, slippery condition and to a bulk approaching that of normal feces. The importance of this will be evident when the known fact is borne in mind that in constipated persons there is found an abnormal moisture-extracting function in the bowel which causes the feces to assume a comparatively dry, hard condition of diminished bulk and which largely accounts for the fact of the constipation on account of the difficulty of expelling the material in such condition.

The cascara arriving with the agar-agar in the large intestine here exerts its laxative property and stimulates peristaltic activity of the muscular walls of the bowel to expel the feces. This is of course the normal action of cascara, but it is the merit of the present product that gelatinous masses of agar-agar in the feces greatly increase the effective power of the cascara to evacuate the bowel contents. This is so because cascara in cases of chronic constipation acts if at all at a great mechanical disadvantage because, first, the dry hard feces present much frictional resistance against being progressed through the bowel; and second, because being scanty in bulk they do not fill the cross-section of the bowel and are not properly grasped by it even under violent peristaltic action. For these reasons cascara administered alone even in strong doses is inadequate in cases of chronic constipation. Whereas combined with agar-agar such cases yield to easy treatment because the gelatinous masses of agar-agar in the bowel do away with the mechanical disadvantages under which cascara administered alone labors. In fact the coöperation between the two ingredients is so effective that the dose of cascara can be limited to just enough to produce gentle peristalsis.

The agar-agar used in making up the herein described product may consist of the ordinary straw-like form broken up into fragments. These mixed with the cascara, and either administered in loose bulk or in a compacted mass as a tablet, are well adapted to form the herein product. The dose will depend on the condition of the user and may vary from a gram or so up to twenty-five grams or more per day. The manner of preparation of the new product may vary widely, also the proportions of the ingredients. However, one simple formula giving good results is to mix together one part of solid extract of cascara with fifty parts of dry granular agar-agar.

It will be noted that the new product comprises a mixture of agar-agar and cascara ingredients. The agar-agar ingredient being in dry, ungelatinized form and having the property of slowly gelatinizing at body temperatures, typified by 98° F., in water and the digestive juices of the alimentary tract without liquefaction; and that accordingly it does not lose its solid condition in its passage through the body, but on the contrary becomes merely gelatinous. Whereas the other ingredient of the product may be described broadly as a laxative.

Having thus described my invention, what I claim is:

1. A product adapted to be taken as an internal remedy, comprising a dry mixture of ungelatinized agar-agar and cascara.

2. A product adapted to be taken as an internal remedy, comprising ungelatinized agar-agar and a laxative.

In witness whereof I have signed my name to this specification in the presence of two subscribing witnesses.

ADOLPH SCHMIDT.

In presence of—
JOHANNES WULF,
HEINRICH EHLERS.